(12) United States Patent
Bonnet et al.

(10) Patent No.: US 8,164,923 B2
(45) Date of Patent: Apr. 24, 2012

(54) DEVICE FOR THE PROTECTION OF AN ELECTRONIC COMPONENT

(75) Inventors: Eric Bonnet, Paris (FR); Didier Gary, Paris (FR); Philippe Dedieu, Paris (FR)

(73) Assignee: Ingenico France, Neuilly sur Seine (FR)

( * ) Notice: Subject to any disclaimer, the term of this patent is extended or adjusted under 35 U.S.C. 154(b) by 314 days.

(21) Appl. No.: 12/595,349

(22) PCT Filed: Apr. 11, 2008

(86) PCT No.: PCT/FR2008/050647
§ 371 (c)(1),
(2), (4) Date: Nov. 6, 2009

(87) PCT Pub. No.: WO2008/145881
PCT Pub. Date: Dec. 4, 2008

(65) Prior Publication Data
US 2010/0053919 A1    Mar. 4, 2010

(30) Foreign Application Priority Data
Apr. 12, 2007  (FR) ..................................... 07 54414

(51) Int. Cl.
*H05K 7/02* (2006.01)
(52) U.S. Cl. ....................................... 361/807; 361/809
(58) Field of Classification Search .................. 361/730, 361/728, 737, 752, 807, 809; 174/520
See application file for complete search history.

(56) References Cited

U.S. PATENT DOCUMENTS

| | | | | |
|---|---|---|---|---|
| 4,593,384 A | * | 6/1986 | Kleijne | 365/228 |
| 4,691,350 A | * | 9/1987 | Kleijne et al. | 713/194 |
| 4,807,284 A | * | 2/1989 | Kleijne | 713/194 |
| 4,811,288 A | * | 3/1989 | Kleijne et al. | 365/52 |
| 5,353,350 A | * | 10/1994 | Unsworth et al. | 713/194 |
| 6,512,454 B2 | * | 1/2003 | Miglioli et al. | 340/541 |
| 6,853,093 B2 | * | 2/2005 | Cohen et al. | 257/678 |
| 6,996,953 B2 | * | 2/2006 | Perreault et al. | 53/449 |
| 7,054,162 B2 | * | 5/2006 | Benson et al. | 361/760 |

FOREIGN PATENT DOCUMENTS
GB    2195478 A    4/1988

OTHER PUBLICATIONS

"Written Opinion of the International Searching Authority" issued in PCT/FR2008/050647.
International Search Report issued in PCT/FR2008/050647 on Nov. 26, 2008.

* cited by examiner

*Primary Examiner* — Dameon Levi
(74) *Attorney, Agent, or Firm* — Vedder Price PC

(57) ABSTRACT

The invention relates to a protection device fixed to a support and covering an electronic component. The protection device comprises at least a first wall corresponding to a first portion of printed circuit comprising at least a first conductive track, the first wall comprising at least a first mechanical guide element; at least a second wall corresponding to a second portion of printed circuit comprising at least a second conductive track, the second wall comprising at least a second mechanical guide element which interacts with the first guide element; and spot welds connecting the first wall to the second wall, at least one of the spot welds also electrically connecting the first conductive track to the second conductive track.

9 Claims, 3 Drawing Sheets

DEVICE FOR THE PROTECTION OF AN ELECTRONIC COMPONENT

FIELD OF THE INVENTION

The present invention relates to a device for protecting an electronic component, for example, an electronic component attached to a printed circuit, to avoid for anyone to have access to said electronic component or to data contained in said electronic component.

DISCUSSION OF PRIOR ART

Some electronic components, for example, a chip card or magnetic card reader, comprise a printed circuit contained in a package. Electronic components may be welded on both surfaces of the printed circuit. They may for example be a display screen, a serial link connector, a connector intended to be connected to the telephone network, a memory card connector, etc. The printed circuit surface on which the display screen is attached is called the front surface and the printed circuit surface opposite to the front surface is called the rear surface.

The security rules prescribed by accrediting bodies generally impose to provide protection devices enabling to prevent the access to certain electronic components attached to the printed circuit. In particular, for certain electronic components attached to the rear surface of the printed circuit, the security rules may impose the presence of specific protection devices for these components. Indeed, such components are more "sensitive" to fraud attempts since a user who manipulates the electronic system generally faces the screen and cannot notice that a fraud attempt has been carried out by tapping of the package on the rear surface side of the printed circuit. The printed circuit may integrate a track used as a protection mesh. This mesh blocks the access to the front surface components by its position on one of the lower layers of the printed circuit. A conventionally-used protection device corresponds to an enveloping flexible circuit (stamped or deformed) comprising a track intended to serve as an intrusion detection mesh, called flexible protection circuit hereafter. The flexible protection circuit is formed of the stacking of several flexible films between which are arranged interconnected conductive tracks forming at least one security circuit. The flexible protection circuit covers the electronic components to be protected and the security circuit is connected at its ends to a processing circuit, provided at the printed circuit level. The processing circuit is capable of detecting the rupture of a conductive track of the security circuit, which may correspond to an intrusion attempt. However, the protection provided by a flexible protection circuit may in certain cases be insufficient.

FIG. 1 shows a simplified example of a printed circuit 10 on which a memory card connector 12 is attached. Memory card connector 12 is arranged along the side of printed circuit 10. Indeed, connector 12 must generally be accessible from an opening provided in the package containing the printed circuit to enable the introduction of a memory card into the connector and the retrieval of a memory card from the connector. The protection provided by a flexible protection circuit covering connector 12 may be insufficient. Indeed, someone could lift or deform the flexible protection circuit to have access to connector 12 without interrupting any conductive track of the security circuit of the flexible protection circuit. Such an intrusion would then not be detected.

FIG. 2 shows an example of protection device 20 conventionally used to protect memory card connector 12. It is a rigid cage 20, attached to printed circuit 10, and covering connector 12 while providing access to connector 12 along the side of printed circuit 10. Cage 20 being rigid and attached to printed circuit 10, it cannot be easily displaced or deformed. Further, a mesh security circuit is generally provided on the internal surfaces of cage 20 to enable the detection of an attempt to drill cage 20.

An example of a conventional method for manufacturing protection device 20 comprises stamping a thin plate corresponding to an insulating film, covered with an electrically conductive material (for example, copper) on both surfaces. The mesh security circuit is formed on one of the surfaces of the stamped thin plate.

It would be desirable to be able to further simplify the manufacturing method of such a protection device.

SUMMARY OF THE INVENTION

The present invention aims at an electronic component protection device, forming a rigid cage covering the electronic component and comprising a security circuit, which is particularly simple to manufacture.

According to another object, the protection device may be manufactured at a low cost.

To achieve all or part of these and other objects, an aspect of the present invention provides a protection device intended to be attached to a support and to at least partially cover at least one electronic component. The protection device comprises at least a first wall corresponding to a first printed circuit portion comprising at least one first conductive track at its surface, the first wall comprising at least a first mechanical guide element; at least a second wall corresponding to a second printed circuit portion comprising at least one second conductive track at its surface, the second wall comprising at least a second mechanical guide element which cooperates with the first mechanical guide element; and weld spots connecting the first wall to the second wall, at least one of the weld spots further electrically connecting the first conductive track to the second conductive track.

According to an embodiment, the clearance between the first wall and the second wall is smaller than 0.5 millimeter.

According to an embodiment, the first and/or the second printed circuit portion corresponds to a stacking of at least two rigid insulating layers, conductive tracks being arranged on a surface of the stacking and additional conductive tracks being arranged between the layers.

According to an embodiment, the second wall further comprises a third mechanical guide element and the first wall further comprises fourth and fifth mechanical guide elements. The device further comprises a third wall corresponding to a third printed circuit portion comprising at least one third conductive track at its surface, the third wall comprising at least a sixth mechanical guide element, which cooperates with the third mechanical guide element, a seventh mechanical guide element which cooperates with the fourth mechanical guide element, and an eighth mechanical guide element. The device further comprises a fourth wall corresponding to a fourth printed circuit portion comprising at least one fourth conductive track at its surface, the fourth wall comprising at least a ninth mechanical guide element which cooperates with the eighth mechanical guide element, and a tenth mechanical guide element which cooperates with the fifth mechanical guide element; and additional welding portions connecting the first wall to the third wall and to the fourth wall.

According to an embodiment, at least one of the additional weld spots electrically connects the third printed circuit portion to the first printed circuit portion and the fourth printed circuit portion to the first printed circuit portion.

According to an embodiment, all the weld spots ensuring an electric connection are intended to face the electronic component.

According to an embodiment, all the weld spots which are intended to be accessible from the outside of the protection device when the protection devices covers the electronic component only ensure a mechanical connection between the first wall and the second wall, between the first wall and the third wall, and between the first wall and the fourth wall.

The present invention also provides an electronic circuit comprising a printed circuit; at least one electronic component attached to the printed circuit; and at least one electronic component protection device such as defined previously.

According to an embodiment, the second wall comprises at least one protruding element, the printed circuit comprising an opening at least partially receiving the protruding element.

The present invention also provides a method for manufacturing a protection device intended to be attached to a support and to at least partially cover at least one electronic component. The method comprises the steps of providing at least a first wall corresponding to a first printed circuit portion comprising at least one first conductive track at its surface, the first wall comprising at least a first mechanical guide element, and at least a second wall corresponding to a second printed circuit portion comprising at least one second conductive track at its surface, the second wall comprising at least a second mechanical guide element; connecting the first wall to the second wall by having the first mechanical guide element cooperate with the second mechanical guide element; and forming weld spots connecting the first wall to the second wall, at least one of the weld spots further electrically connecting the first conductive track to the second conductive track.

BRIEF DESCRIPTION OF THE DRAWINGS

The foregoing objects, features, and advantages of the present invention, as well as others, will be discussed in detail in the following non-limiting description of specific embodiments in connection with the accompanying drawings, among which.

DETAILED DESCRIPTION

Figure 1:
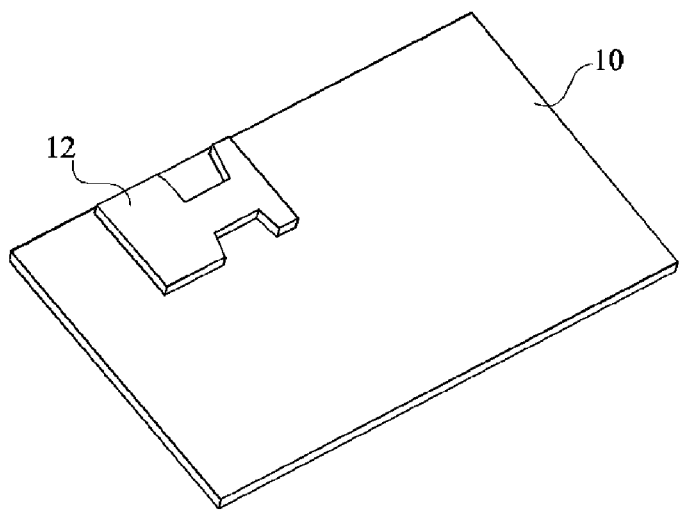
FIG. 1, previously described, shows a simplified example of an electronic component attached to a printed circuit.
Figure 2:
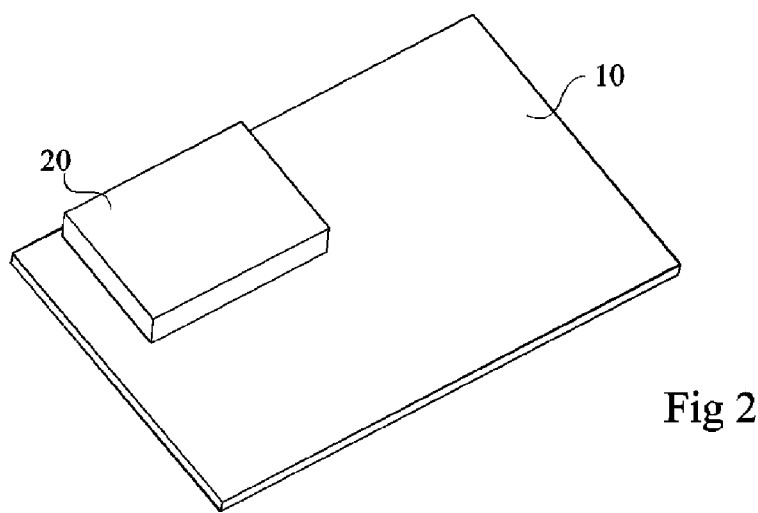
FIG. 2, previously described, schematically shows a conventional example of a device for protecting the electronic component of FIG. 1.

For clarity, the same elements have been designated with the same reference numerals in the different drawings.

Figure 3:
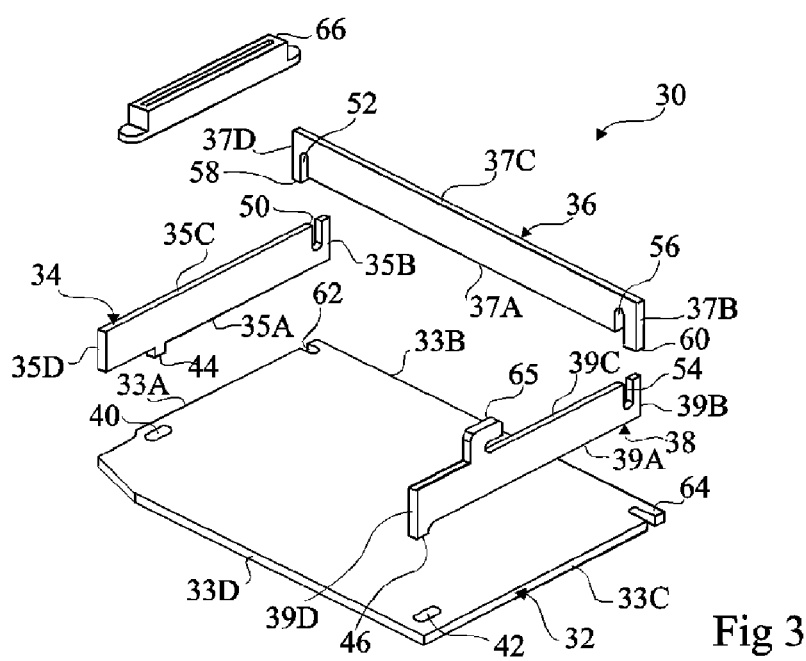
FIGS. 3 and 4 respectively are an exploded view and a perspective view of an embodiment of a protection device according to the present invention.
Figure 4:
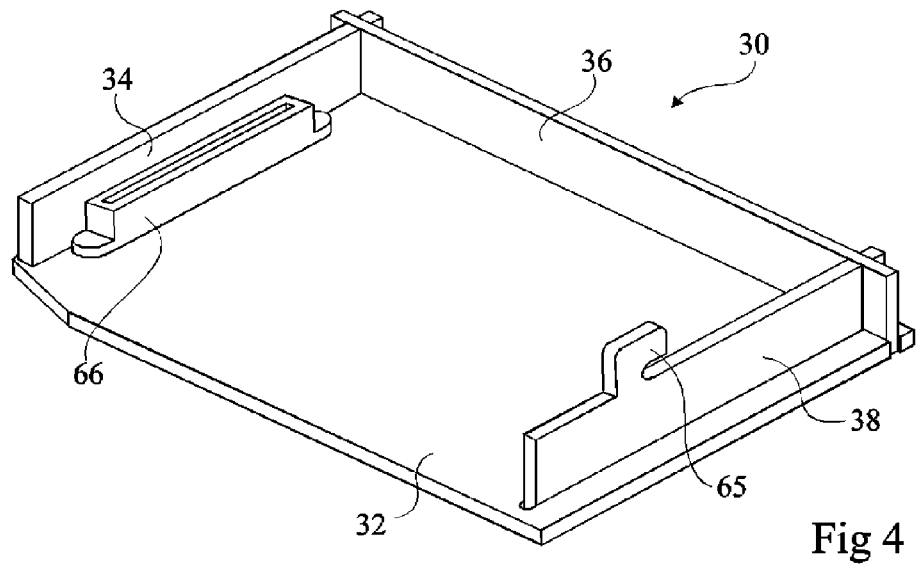

FIGS. 3 and 4 respectively are an exploded view and a perspective view of an embodiment of a protection device 30 according to the invention. Protection device 30 corresponds to a cage comprising:

a planar bottom plate 32 of rectangular general shape, comprising four edges 33A, 33B, 33C, and 33D, parallel two by two, edges 33A and 33D being however slightly tapered at one end, for example, to adapt to bulk constraints;

a first planar lateral plate 34 of rectangular general shape, comprising four edges 35A, 35B, 35C, and 35D, parallel two by two, edge 35A being in contact with plate 32;

a second planar lateral plate 36 of rectangular general shape, adjacent to plate 34, comprising four edges 37A, 37B, 37C, and 37D, parallel two by two, edge 37A being in contact with plate 32; and a third planar lateral plate 38 of rectangular general shape, adjacent to plate 36, comprising four edges 39A, 39B, 39C, and 39D, parallel two by two, edge 39A being in contact with plate 32.

Plates 32, 34, 36, 38 correspond to cut portions of a printed circuit formed of a stacking of epoxy layers at the level of which conductive tracks are provided.

Bottom plate 32 comprises two oblong holes 40, 42, which each extend along one of parallel edges 33A, 33C close to hole 33D. Hole 40 receives a slug 44 which projects from edge 35A of lateral plate 34 and hole 42 receives a slug 46 which projects from edge 39A of lateral plate 38. Lateral plate 34 comprises a notch 50 which extends along edge 35B and emerges on edge 35C. Notch 50 cooperates with a notch 52 of complementary shape provided at the level of lateral plate 36, which extends along edge 37D and which emerges on edge 37A. Similarly, lateral plate 38 comprises a notch 54 which extends along edge 39B and emerges on edge 39C. Notch 54 cooperates with a notch 56 of complementary shape provided at the level of lateral plate 36, which extends along edge 37B and which emerges on edge 37A.

Lateral plate 36 comprises two slugs 58, 60 which project from edge 37A at the level of edges 37D and 37B, each cooperating with a notch 62, 64 provided on bottom plate 32, notches 62, 64 extending along edge 33B and respectively emerging on edges 33A and 33C. Plate 38 comprises a hook-shaped protrusion 65 which projects from edge 39C. Protection device 30 further comprises a connector 66 attached to bottom plate 32.

The assembly of protection device 30 may be performed by connecting plates 34, 36, 38 to one another by having notch 50 of plate 34 cooperate with notch 52 of plate 36 and by having notch 54 of plate 38 cooperate with notch 56 of plate 36. The assembly formed by the three plates 34, 36, 38 is then placed on bottom plate 32 by introducing slug 44 of plate 34 into hole 40 of bottom plate 32, by introducing slug 46 of plate 38 into hole 42 of bottom plate 32, and by introducing slugs 58, 60 of plate 36 into notches 62, 64 of bottom plate 32. The cooperation of slugs 44, 46, 58, 60 and of the corresponding holes 40, 42 and notches 62, 64 and of notches 50, 52, 54, 56 together enables to obtain an automatic alignment of plates 32, 34, 36, 38 with respect to one another with clearances that may be smaller than 0.5 mm, preferably smaller than 0.2 mm. Plates 32, 34, 36, 38 are then welded to one another, for example, according to a reflow welding method. Such a method comprises only arranging solder paste portions on plate 32 at the junctions between plates 32, 34, 36, 38. The solder paste for example corresponds to a tin-based mixture of viscous texture. As an example, each solder paste portion has a thickness of several hundreds of micrometers. Protection device 30 is then heated in a reflow furnace to bring the solder paste portions to a liquid phase. At the next cooling step, a solidification of the solder paste portions, which form welds, is obtained. Connector 66 may also be welded to bottom plate 32 during the reflow welding operation.

Figure 5:
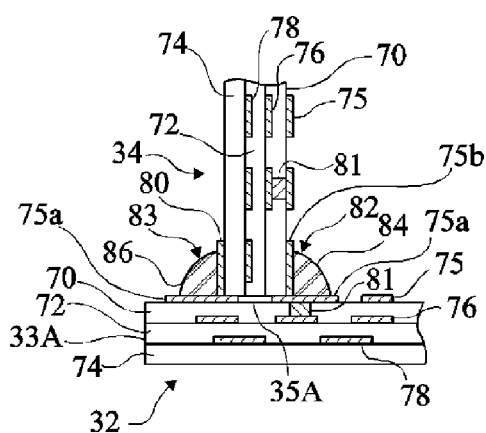
FIGS. 5 and 6 respectively are a simplified cross-section view and a detail view of the protection device of FIG. 4.

FIG. 5 is a simplified cross-section view of plates 32 and 34 at the connection between these plates. FIG. 5 is not drawn to scale. As an example, each plate 32, 34 corresponds to a printed circuit portion comprising a stacking of three insulating layers 70, 72, 74, for example, epoxy layers, each having a 150-μm thickness. Conductive tracks 75, 76, 78, for example, made of copper, are respectively arranged at the surface of layers 70, 72, 74. As described hereafter, some of tracks 75 are used as bonding points for the forming of weld spots. The tracks 75 of plate 32 used as bonding points for the forming of weld spots are designated with reference 75a and the tracks 75 of plate 34 used as bonding points for the forming of weld spots are designated with reference 75b. Further, for plates 34, 36, 38, conductive tracks 80, for example, made of copper, are also provided at the surface of insulating layer 74 on the side opposite to conductive tracks 78.

Vias 81, formed in layer 70, made each connect one of tracks 75 to one of tracks 76. Plate 34 is laid along edge 35A against plate 32 and defines with plate 32 two junction regions 82, 83 on either side of plate 34. A weld spot 84, provided at the level of junction region 82, electrically connects a track 75a of plate 32 to a track 75b of plate 34. Another weld spot 86, provided at the level of junction region 83, electrically connects a track 75a of plate 32 to a track 80 of plate 34 and only ensures a function of mechanical connection between plates 32 and 34.

The position of conductive tracks 75a, 75b, and 80 used as bonding points for weld spots 84, 86 is an important parameter for the proper operation of the reflow welding method. Indeed, tracks 75a of plate 32 must be close to tracks 75b and 80 of plates 34, 36, 38. For this purpose, tracks 75b and 80 of plates 34, 36, 38 are located at the end of the plate and tracks 75a of plate 32 partly extend under the edges of plates 34, 36, 38.

Figure 6:
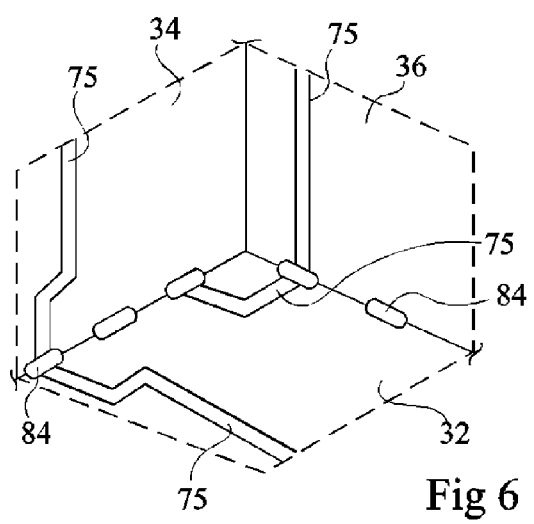

FIG. 6 is a simplified view at the junction of plates 32, 34, and 36. Weld spots 84 are distributed along the contact regions between each pair of adjacent plates. The weld spots 84 which ensure an electric connection between tracks 75 of two adjacent plates are arranged inside of protection device 30, that is, they face the component to be protected once protection device 30 is attached to the printed circuit. Some of weld spots 84 may only ensure a mechanical connection. Weld spots 86 which only ensure a mechanical connection between two adjacent plates are, as for them, provided outside of protection device 30, that is, they are visible from the outside once protection device 30 has been attached to the printed circuit. This gives the assembly a mechanical strength greater than that provided by the sole weld spots 84 located on the inside.

Conductive tracks 75, 76, 78 of plates 32, 34, 36, 38, interconnected especially by vias 81 and weld spots 84, form at least one mesh-type security circuit. The ends of the security circuit emerge at the level of connector 66.

Figure 7:
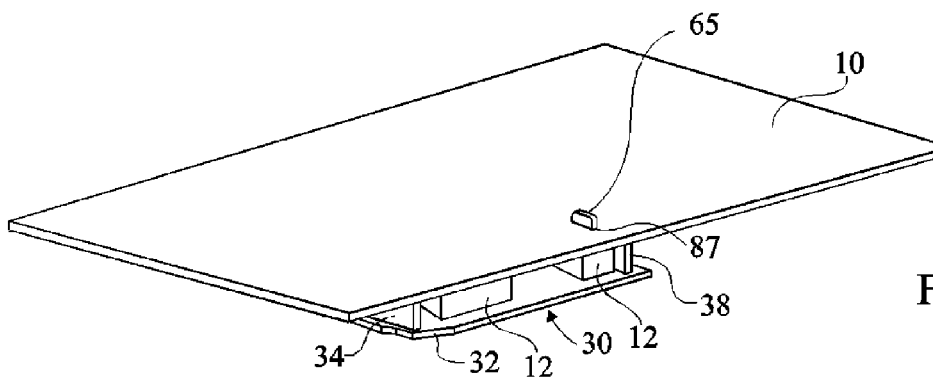
FIG. 7 shows the protection device of FIG. 4 once attached to a printed circuit.

FIG. 7 shows protection device 30 once assembled on a printed circuit 10. Protection device 30 is assembled on printed circuit 10 by introduction of hook 65 into an opening 87 provided at the level of printed circuit 10. This enables to properly position protection device 30 with respect to printed circuit 10. Protection device 30 is then manually welded to printed circuit 10 by weld spots distributed at the periphery of device 30.

Generally, protection device 30 may be electrically connected to printed circuit 10 via connector 66 or via the welds performed when protection device 30 is positioned on printed circuit 10. In the second case, among the welds connecting protection device 30 to printed circuit 10, some welds electrically connect the security circuit of protection device 30 to that of printed circuit 10 and other welds ensure a mechanical hold of protection device 30.

More specifically, in the present embodiment, the electric connection between the security circuit of protection device 30 and a processing circuit provided at the level of printed circuit 10 is obtained by providing a connection plug, not visible in FIG. 7, at the level of printed circuit 10 capable of cooperating with connector 66 when device 30 is attached to printed circuit 10. An attempt to remove or degrade device 30 then results in a rupture of a conductive track of the security circuit, which is detected by the processing system. The security circuit may also extend all the way to hook 65 to be able to detect a possible rupture thereof.

Figure 8:
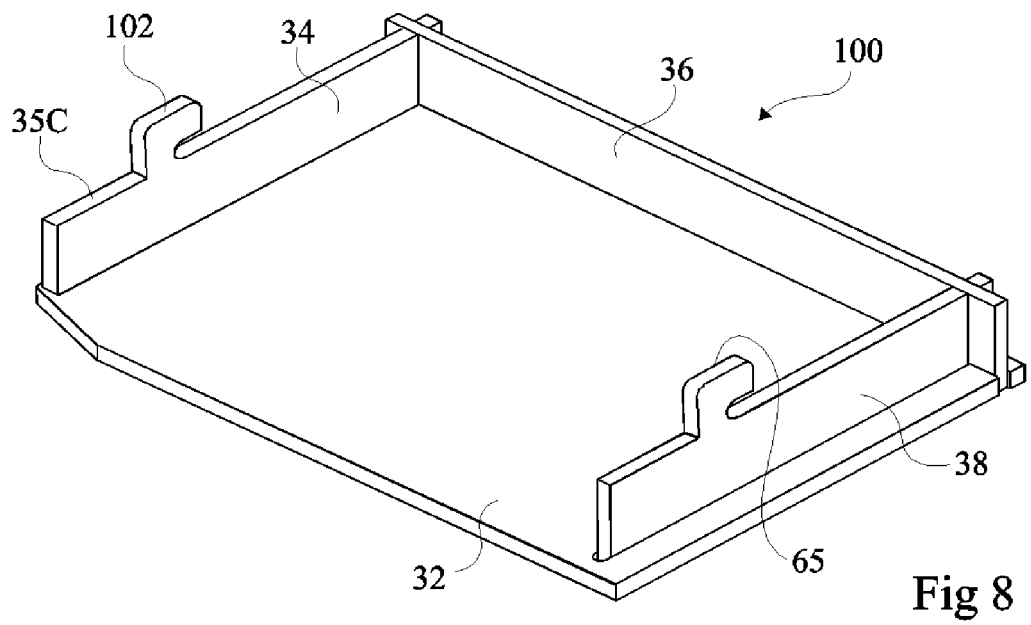
FIGS. 8 and 9 are perspective views of other embodiments of the protection device according to the present invention.

FIG. 8 shows another embodiment of protection device 100 according to the invention. As compared with protection device 30, protection device 100 comprises, in addition to hook 65, an additional hook 102 which projects from edge 35C of plate 34. Additional hook 102 is for example arranged symmetrically to hook 65. Connector 66 may also be omitted. The electric connection between the security circuit of device 100 and printed circuit 10 can then be obtained by weld spots connecting the ends of hooks 65, 102 to printed circuit 10. Such weld spots may be formed at the surface of printed circuit 10 which faces protection device 100. This enables to make any attempt to neutralize protection device 100 even more difficult.

Figure 9:
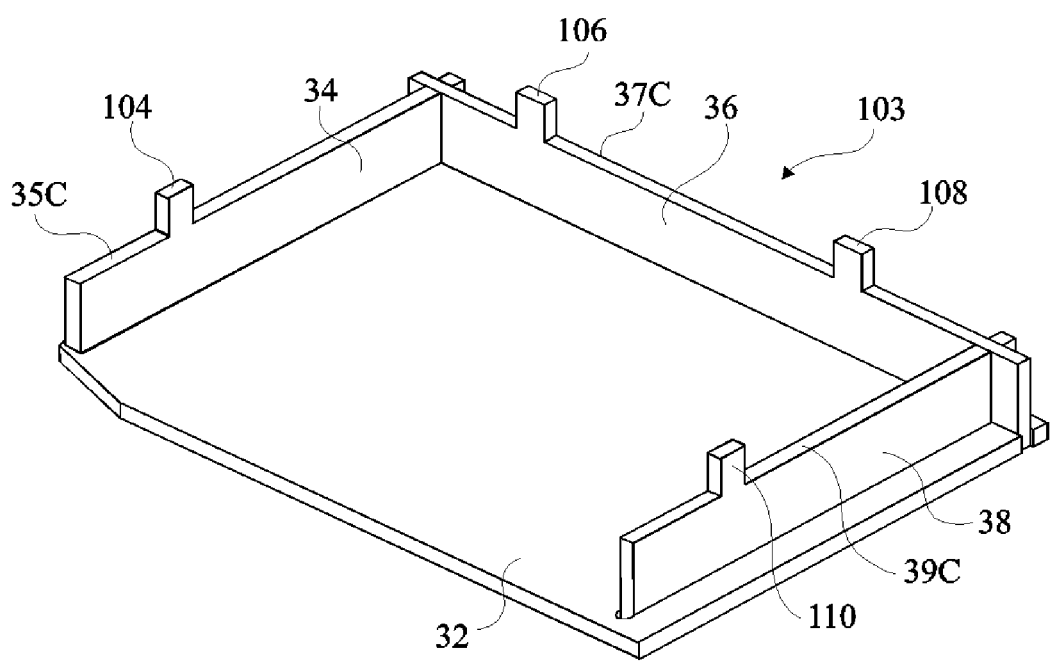

FIG. 9 shows another embodiment of device 103 according to the invention. As compared with protection device 30, instead of hook 65, four slugs 104, 106, 108, 110, one slug 104 which projects from edge 35C of plate 34, two slugs 106, 108 which project from edge 37C of plate 36, and one slug 110 which projects from edge 39C of plate 38, are provided. The security circuit extends at least all the way to the end of two of slugs 104, 106, 108, 110. The assembly of protection device 103 is obtained by introducing slugs 104, 106, 108, 110 into holes provided at the level of printed circuit 10. Once the security device has been installed, at least two of slugs 104, 106, 108, 110 protrude from the surface of printed circuit 10 facing protection device 103. The electric connection between the security circuit of device 103 and printed circuit 10 can then be obtained by weld spots connecting the printed circuit to the slug portions protruding from the surface of the printed circuit facing protection device 103. This enables to make an attempt to neutralize protection device 103 even more difficult.

Of course, the present invention is likely to have all various alterations and modifications which will occur to those skilled in the art. In particular, although in the previously-described embodiments, the protection device is formed of four plates, it should be clear that the protection device may be formed of a different number of plates. Further, only some of the plates forming the protection device may correspond to printed circuit portions, the other plates being then formed of a rigid insulating material.

The invention claimed is:

1. A protection device intended to be attached to a support and to at least partially cover at least one electronic component, comprising:
at least a first wall corresponding to a first printed circuit portion comprising at least one first conductive track at its surface, the first wall comprising at least first, fourth and fifth mechanical guide elements;
at least a second wall corresponding to a second printed circuit portion comprising at least one second conductive track at its surface, the second wall comprising at least a second mechanical guide element which cooperates with the first mechanical guide element, the second wall further comprising a third mechanical guide element;

a third wall corresponding to a third printed circuit portion comprising at least one third conductive track at its surface, the third wall comprising at least a sixth mechanical guide element, which cooperates with the third mechanical guide element, a seventh mechanical guide element which cooperates with the fourth mechanical guide element, and an eighth mechanical guide element;

a fourth wall corresponding to a fourth printed circuit portion comprising at least one fourth conductive track at its surface, the fourth wall comprising at least a ninth mechanical guide element which cooperates with the eighth mechanical guide element, and a tenth mechanical guide element which cooperates with the fifth mechanical guide element;

weld spots connecting the first wall to the second wall, at least one of the weld spots further electrically connecting the first conductive track to the second conductive track; and additional welding portions connecting the first wall to the third wall and to the fourth wall.

2. The protection device of claim 1, wherein the clearance between the first wall and the second wall is smaller than 0.5 millimeter.

3. The protection device of claim 1, wherein the first and/or the second printed circuit portion corresponds to a stacking of at least two rigid insulating layers, conductive tracks being arranged on a surface of the stacking and additional conductive tracks being arranged between the layers.

4. The protection device of claim 1, wherein at least one of the additional weld spots electrically connects the third printed circuit portion to the first printed circuit portion and the fourth printed circuit portion to the first printed circuit portion.

5. The protection device of claim 4, wherein all the weld spots ensuring an electric connection are intended to face the electronic component.

6. The protection device of claim 4, wherein all the weld spots which are intended to be accessible from the outside of the protection device when the protection devices covers the electronic component only ensure a mechanical connection between the first wall and the second wall, between the first wall and the third wall, and between the first wall and the fourth wall.

7. An electronic circuit comprising:
a printed circuit;
at least one electronic component attached to the printed circuit; and
at least one electronic component protection device of claim 1.

8. The electronic circuit of claim 7, wherein the second wall comprises at least one protruding element, the printed circuit comprising an opening at least partially receiving the protruding element.

9. A method for manufacturing a protection device intended to be attached to a support and to at least partially cover at least one electronic component comprising the steps of:

providing at least a first wall corresponding to a first printed circuit portion comprising at least one first conductive track at its surface, the first wall comprising at least first, fourth and fifth mechanical guide elements;

providing at least a second wall corresponding to a second printed circuit portion comprising at least one second conductive track at its surface, the second wall comprising at least a second mechanical guide element, the second wall further comprising a third mechanical guide element;

providing a third wall corresponding to a third printed circuit portion comprising at least one third conductive track at its surface, the third wall comprising at least a sixth mechanical guide element which cooperates with the third mechanical guide element, a seventh mechanical guide element which cooperates with the fourth mechanical guide element, and an eighth mechanical guide element;

providing a fourth wall corresponding to a fourth printed circuit portion comprising at least one fourth conductive track at its surface, the fourth wall comprising at least a ninth mechanical guide element which cooperates with the eighth mechanical guide element, and a tenth mechanical guide element which cooperates with the fifth mechanical guide element;

connecting the first wall to the second wall by having the first mechanical guide element cooperate with the second mechanical guide element;

forming weld spots connecting the first wall to the second wall, at least one of the weld spots further electrically connecting the first conductive track to the second conductive track; and forming additional welding portions connecting the first wall to the third wall and to the fourth wall.

* * * * *